United States Patent
Illikkal et al.

(10) Patent No.: US 11,238,203 B2
(45) Date of Patent: Feb. 1, 2022

(54) SYSTEMS AND METHODS FOR ACCESSING STORAGE-AS-MEMORY

(71) Applicant: Intel Corporation, Santa Clara, CA (US)

(72) Inventors: Rameshkumar Illikkal, Folsom, CA (US); Ananth Sankaranarayanan, Portland, OR (US); David Zimmerman, El Dorado Hills, CA (US); Pratik M. Marolia, Hillsboro, OR (US); Suchit Subhaschandra, Portland, OR (US); Dave Minturn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1035 days.

(21) Appl. No.: 15/640,448

(22) Filed: Jun. 30, 2017

(65) Prior Publication Data

US 2019/0005176 A1    Jan. 3, 2019

(51) Int. Cl.
*G06F 30/331* (2020.01)
*G06F 21/76* (2013.01)
*G06F 3/06* (2006.01)
*G06F 9/445* (2018.01)
*G06F 12/0817* (2016.01)
(Continued)

(52) U.S. Cl.
CPC ............ *G06F 30/331* (2020.01); *G06F 3/061* (2013.01); *G06F 3/0628* (2013.01); *G06F 3/0658* (2013.01); *G06F 3/0674* (2013.01); *G06F 9/44505* (2013.01); *G06F 12/0817* (2013.01);
(Continued)

(58) Field of Classification Search
CPC ...... G06F 30/331; G06F 30/34; G06F 3/0658; G06F 12/0817; G06F 3/0674; G06F 21/79; G06F 21/76; G06F 3/061; G06F 3/0628; G06F 9/44505; G06F 16/2455; G06F 13/1668; G06F 13/1673; G06F 13/4068;
(Continued)

(56) References Cited

U.S. PATENT DOCUMENTS 10,402,326 B1 *  9/2019  Hall ..................... G06F 12/0815
2015/0143003 A1 *  5/2015  Trout ................... G06F 13/4282
                                                              710/104
(Continued)

OTHER PUBLICATIONS

"Why Put FPGAs in your CPU Socket?", Paul Chow, High-Performance Reconfigurable Computing Group, Department of Electrical and Computer Engineering University of Toronto, http://www.cs.tsukuba.ac.jp/~yoshiki/ICFPT/2013/Day3_keynote.pdf, Dec. 11, 2013.*

*Primary Examiner* — Nha T Nguyen
(74) *Attorney, Agent, or Firm* — Alliance IP, LLC

(57) ABSTRACT

Aspects of the embodiments are directed to systems, devices, and methods for accessing storage-as-memory. Embodiments include a microprocessor including a microprocessor system agent and a field programmable gate array (FPGA). The FPGA including an FPGA system agent to process memory access requests received from the microprocessor system agent across a communications link; a memory controller communicatively coupled to the system agent; and a high speed serial interface to link the system agent with a storage system. Embodiments can also include a storage device connected to the FPGA by the high speed serial interface.

23 Claims, 14 Drawing Sheets

(51) Int. Cl.
    *G06F 21/79* (2013.01)
    *G06F 30/34* (2020.01)

(52) U.S. Cl.
    CPC .............. *G06F 21/76* (2013.01); *G06F 21/79* (2013.01); *G06F 30/34* (2020.01)

(58) Field of Classification Search
    CPC ..... G06F 2213/0026; G06F 2213/0024; Y02D 10/00
    See application file for complete search history.

(56) References Cited

U.S. PATENT DOCUMENTS

2018/0240032 A1* 8/2018 van Rooyen .......... G16B 20/00
2020/0089612 A1* 3/2020 Rustad ................ G06F 12/0828

* cited by examiner

SYSTEMS AND METHODS FOR ACCESSING STORAGE-AS-MEMORY

FIELD

This disclosure pertains to systems and methods for accessing storage-as-memory.

BACKGROUND

Storage devices are often accessed as devices on a long latency hardware interface, through inefficient software layers. With the advent of low latency storage devices, the access latencies to these devices are getting very low, approaching generic DDR memory access latencies.

DETAILED DESCRIPTION

Figure 1:
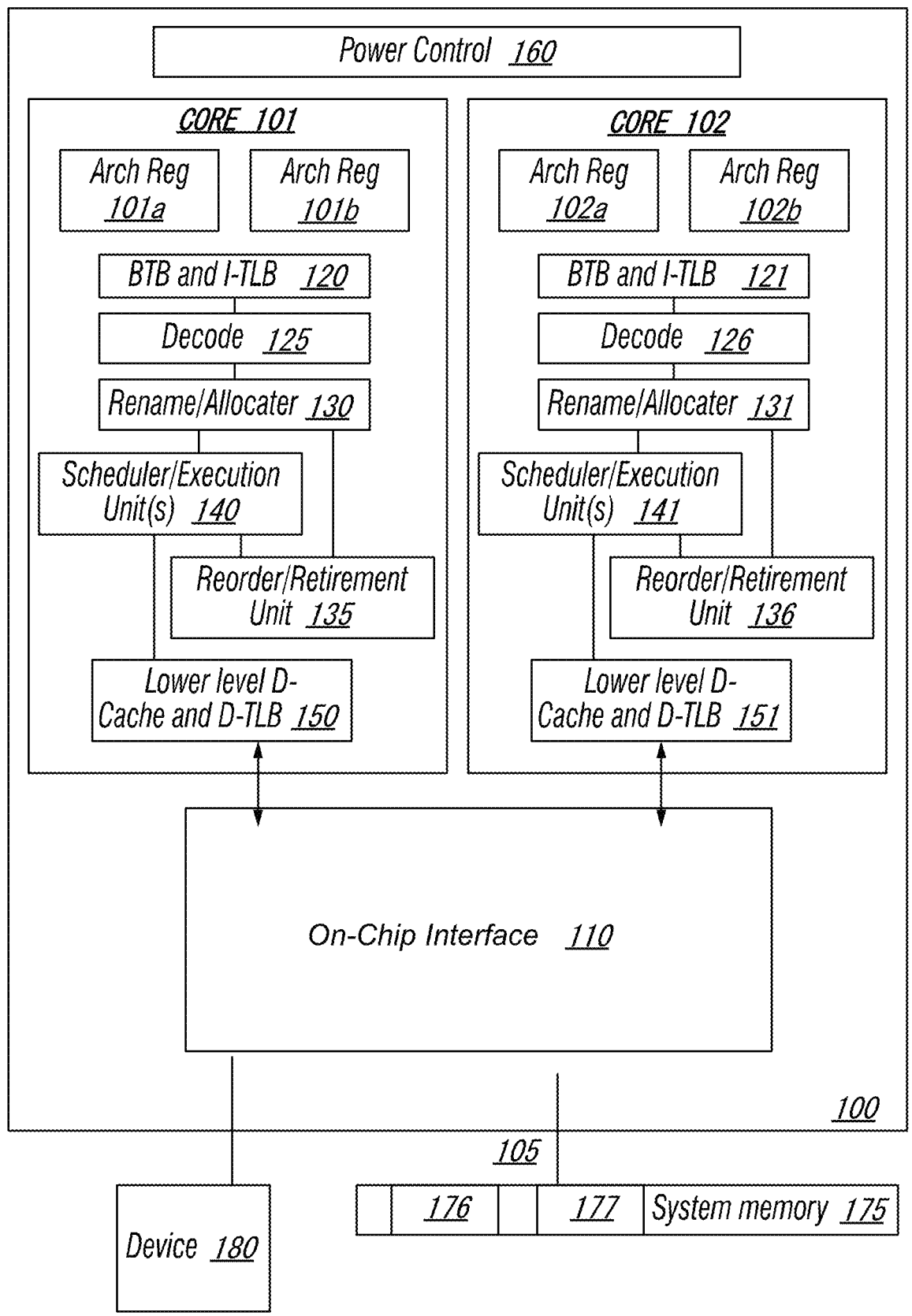
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point Link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Current software and hardware interface overheads prohibit the effective utilization of improved storage device capabilities, such as storage-as-memory. This disclosure is directed to exposing storage devices as coherent memory accessible directly from the core using hardware capabilities. The disclosure includes using a processor-integrated field programmable gate array (FPGA) to leverage the programmable logic in FPGA to create a system agent in the coherency domain to extend the memory semantics over PCIe to the storage device.

Today the storage is long latency device, programmed and accessed using device model from core. This means long latency IO interfaces (doorbell, interrupt) and many layers of storage SW stack. This disclosure exposes the storage (specifically the low latency NVM technologies with low device access latency) as coherent memory. This allows exposing huge sizes of memory to the system, which benefits many applications like in-memory databases, and provides a low latency storage for many big data applications.

Figure 2:
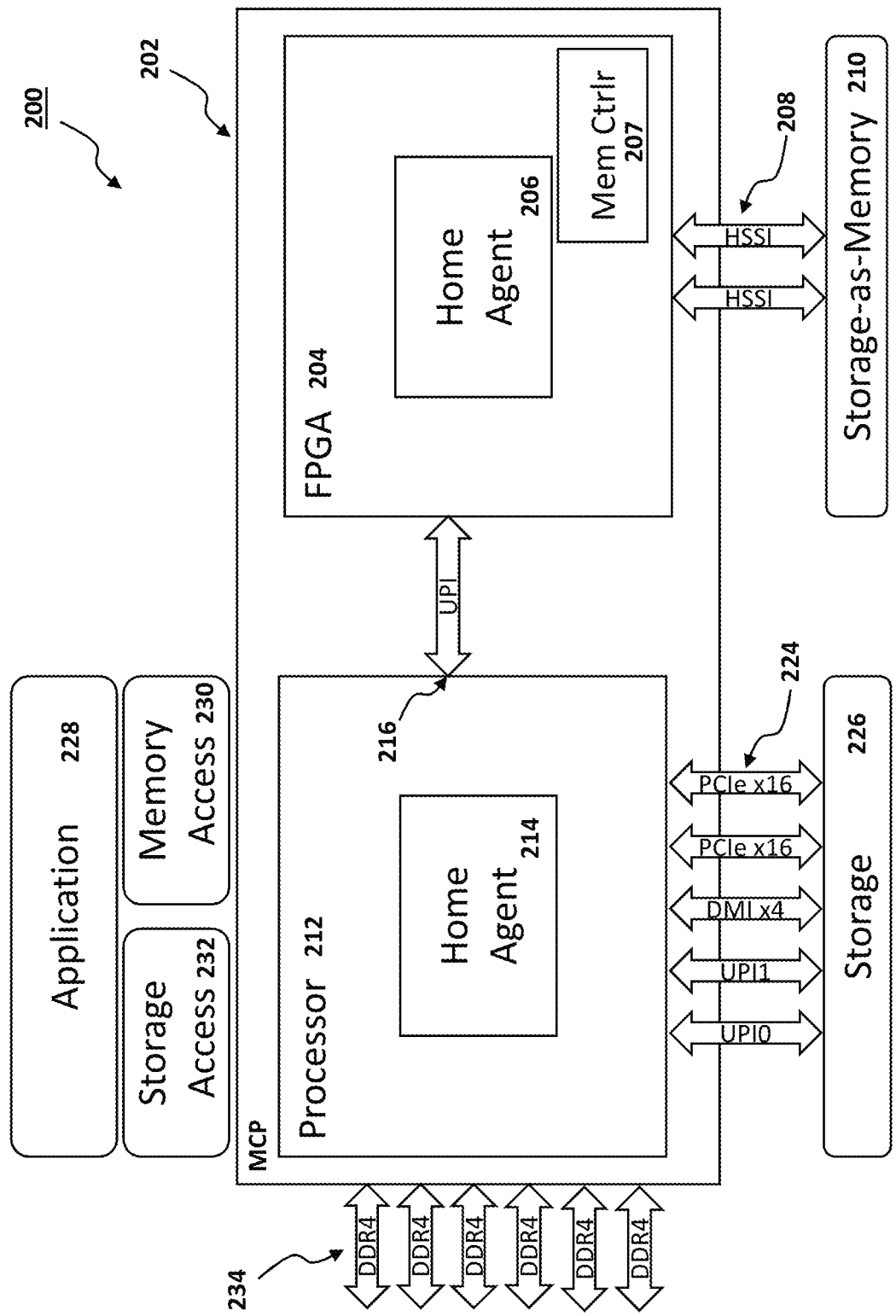
FIG. 2 is a schematic diagram of an example multi-chip platform that includes a field programmable gate array and system agent in accordance with embodiments of the present disclosure.

FIG. 2 is a schematic diagram 200 of an example multi-chip platform (MCP) 202 that includes a field programmable gate array (FPGA) 204 and system agent 206 in accordance with embodiments of the present disclosure. The MCP 202 includes a processor 212. Processor 212 can be a hardware processor, such as a microprocessor. The processor 212 includes a system agent 214 configured to execute memory access instructions from e.g., an application 228. Application 228 can make storage access requests 232 and memory access requests 230, each of which can be processed by the processor 212 (or more specifically by the system agent 214). A system agent can access storage 226 through a PCIe interface 224 or through other interfaces, such as a Serial Advanced Technology Attachment (SATA)-compliant link. The memory accesses are routed through the system agent 214 to the DDR interface 234 through system agent 214+ memory controller 207 or to other home agents in the coherency domain.

The MCP 202 also includes an FPGA 204. FPGA 204 includes a system agent 206 implemented in hardware, such as by digital design. The system agent 206 is configured to execute memory access instructions. The system agent 206 can recognize the physical addresses for its channels in order to execute memory access requests through a QPI or UPI compliant link 216. The system agent 206 translates the physical address into a channel address, and passes it to a memory controller 207. A system agent is responsible for mapping memory to processors system address space. A system agent 206 may also be responsible for managing coherency across caches in the system. Each memory controller 207 has a table to find what to do with each range of channel addresses it is handing. The system agent 206 can advertise an address space to system agent 214. System agent 214 can direct memory access requests to the advertised address spaces to system agent 206.

Aspects of the disclosure are directed to the system agent 206 built into the FPGA 204. The system agent 206 is configured to be compliant with the processor QuickPath Interconnect (QPI) or UltraPath Interconnect (UPI) coherency domain and participate in the memory transactions on behalf of the storage device 210 connected through the HSSI (High Speed Serial Interface) 208. The system agent 206 exposes and manages the storage-as-memory 210 connected to it through HSSI 208. The system agent 206 participates in the memory transactions through the QPI/UPI protocols 216 and responds to the messages related to the memory behind it.

The system agent 206 also manages the directory structure, either stored in the memory it owns or in the DRAM connected to the processor and optionally caches it in the FPGA Block RAM 234.

The system agent 206 is configured to operate as hardware design that couples a storage-as-memory to a processor through a hardware-based coherency protocol.

When a memory request arrives at system agent 214, system agent 214 can identify system agent 206 as a responsible entity for processing the memory access request. For example system agent 214 can identify system agent 206 that is part of the FPGA 204 for processing the memory access request. The system agent 206 can process the memory access request by accessing the appropriate address from the storage-as-memory element(s) 210 through the HSSI 208.

Though shown as an MCP, a single chip platform can also be used, such as an application specific integrated circuit. Embodiments can be extended beyond an FPGA implementation to include any accelerator that can connect to a processor and storage, and can include a hardware system agent. Other examples of such accelerators can include special purpose accelerator chips or general purpose computing on graphics processing units (GPGPUs).

Figure 3:
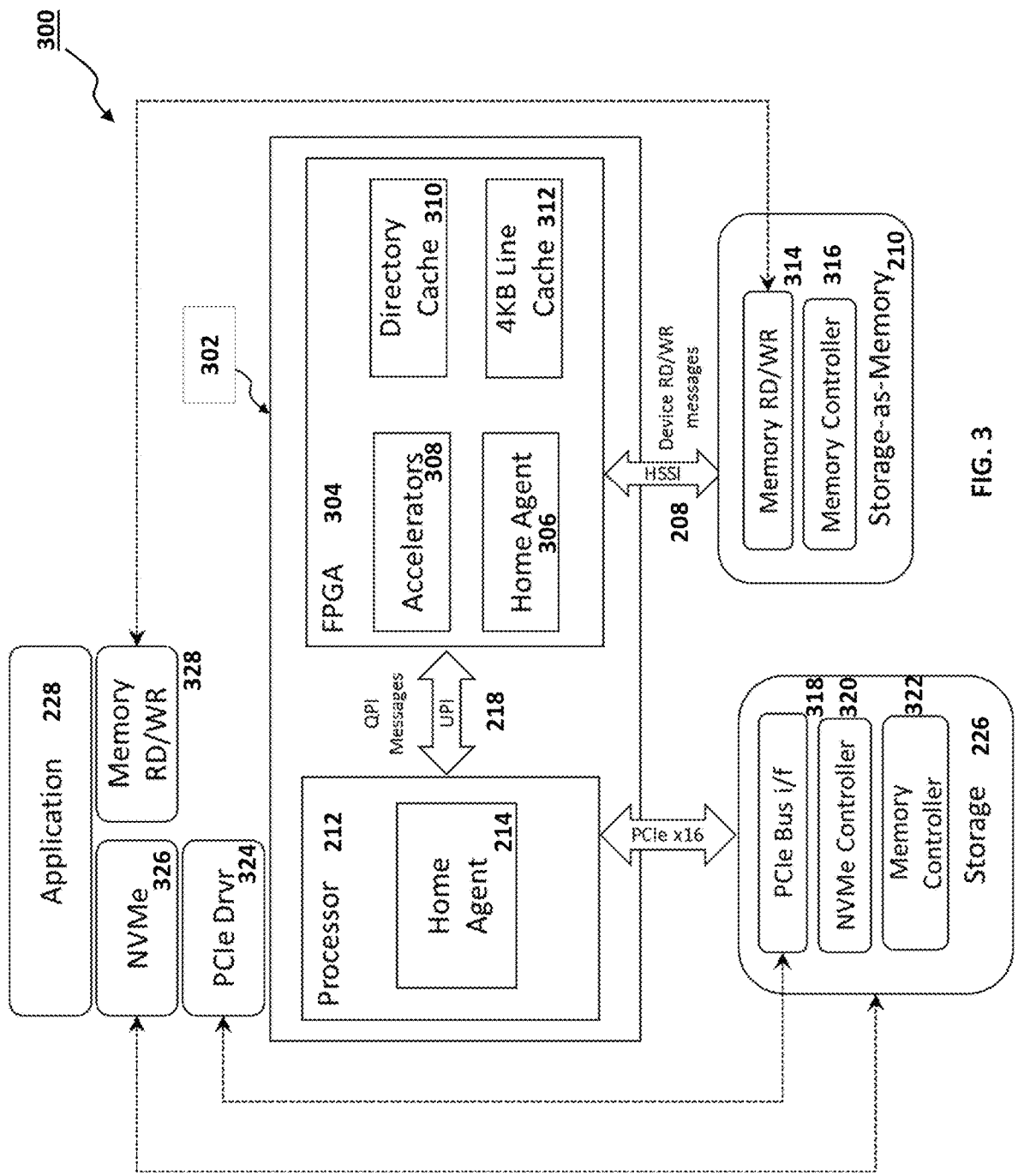
FIG. 3 is a schematic diagram of another example multi-chip platform that includes a field programmable gate array and system agent in accordance with embodiments of the present disclosure.

FIG. 3 is a schematic diagram 300 of another example multi-chip platform 302 that includes a field programmable gate array 304 and system agent 306 in accordance with embodiments of the present disclosure. In some embodiments, the FPGA 304 supports a direct mapping 314 of memory RD/WR 328 transactions to the memory controller 316 through the system agent 306, which provides additional flow control. The FPGA 304 also includes one or more accelerator circuits 308 for performing in-line processing of data (either read or write data).

The FPGA 304 can include a 4 KB line cache 312. The 4 KB line cache 312 can cache data blocks from the storage 210. In some embodiments, memory reads and writes can account for long latency by using asynchronous read/write instructions. The system agent 214 can send a read confirmation to the processor system agent 214. The read confirmation can be sent during the latency of the read execution, allowing the processor 212 to move onto the next processing steps. The system agent 306 can cache the data block retrieved from storage 210 into line cache 312. Similarly, the system agent 306 can provide a write confirmation and cache the write data in line cache 312, and then store write data into memory in storage-as-memory device 210.

The system agent 306 can also cache data fed from the storage 210 at higher block sizes (in 4 KB blocks in 4 KB line cache 312, as opposed to the 64 B request on the cache line).

A directory cache 310 can provide additional performance by holding a portion or subset of the memory directory. The directory cache 310 can be part of the FPGA 304 that caches a portion of the memory directory—the memory represented by the potentially several terabytes of storage available (or more).

In embodiments, the FPGA 304 can emulate a PCIe root complex. By emulating the PCIe root complex and PCIe interface, the system agent 306 can expose the memory in storage-as-memory 210 directly.

In some implementations, an existing PCIe IP in the FPGA 304 to connect to the existing PCIe based storage solutions. To extend coherent memory to the device side, the QPI messages are tunneled through PCIe protocol. Instead of handling Non-Volatile Memory express (NVMe) protocols 326 over PCIe, the controller needs to handle RD/WR transactions over PCIe.

Figure 4:
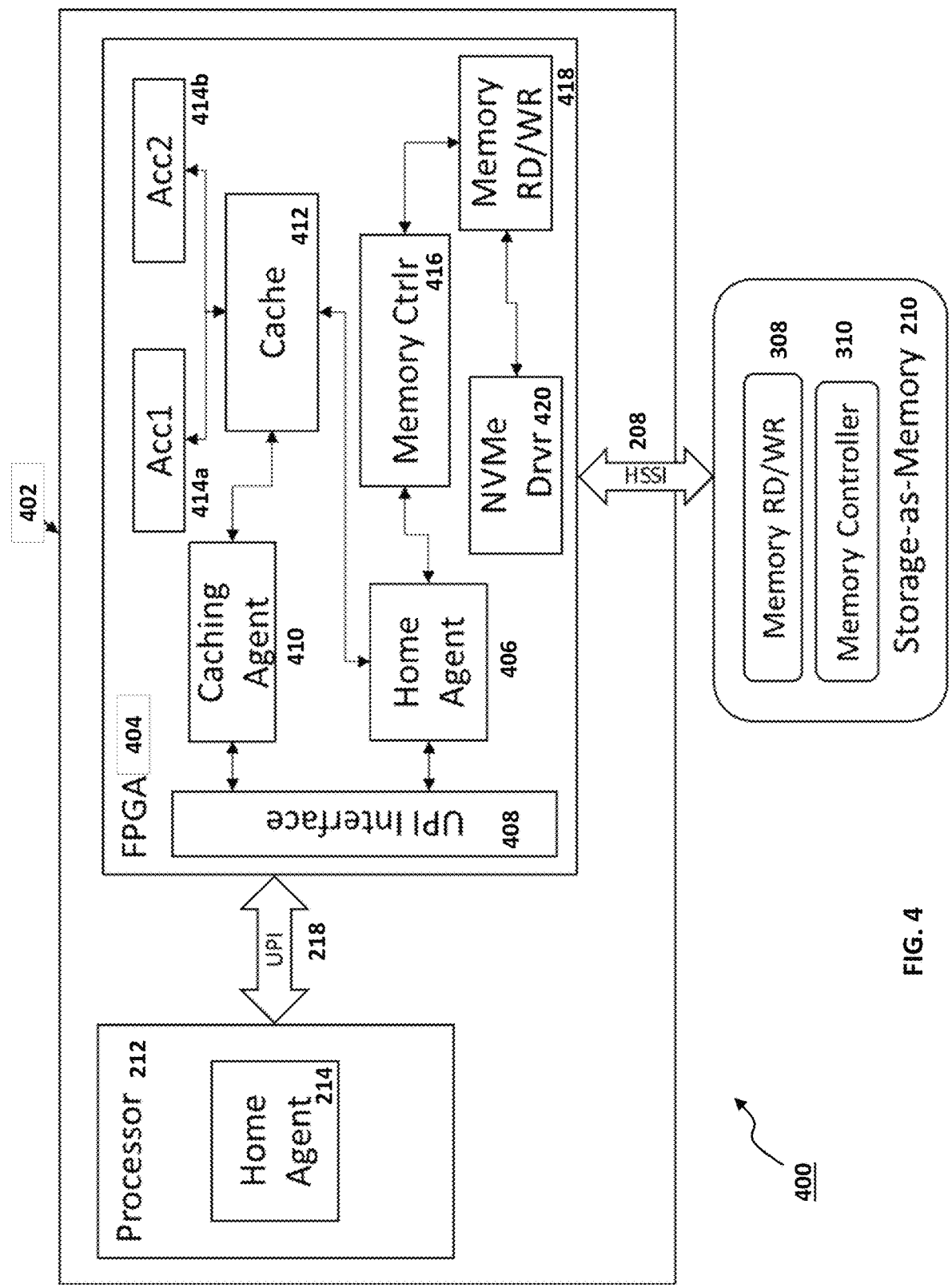
FIG. 4 is a schematic diagram of an example multi-chip platform that includes a field programmable gate array and system agent illustrating in-line accelerator circuits in accordance with embodiments of the present disclosure.

FIG. 4 is a schematic diagram 400 of an example multi-chip platform 402 that includes a field programmable gate array 404 and system agent 406 illustrating in-line accelerator circuits in accordance with embodiments of the present disclosure. Embodiments include inline accelerators 414a and 414b built into FPGA 404 for running memory-side streaming accelerations (e.g., encryption/decryption, compression/decompression, structured query language (SQL) acceleration, extract-transform-load (ETL) functions, etc.). The accelerators 414a and 414b could use an optional cache 412 and cache controller 410 built into the FPGA logic to improve performance.

FIG. 4 also illustrates how certain memory controller components can be moved to the FPGA 404 to expose storage as memory 210. The FPGA 404 can include a memory controller 416 that includes a 4 KB cache memory 418. The FPGA 404 can also include the NVMe driver 420 as a hardware circuit design emulating NVMe driver functionality.

Similar to those embodiments shown above, the processor 212 can include a system agent 214 that can interface with the FPGA 404 across a QPI compliant link, such as UPI link 218. The FPGA 404 is shown to include a UPI interface 408 that can facilitate QPI compliant (or UPI specific) protocols between the system agent 406 or caching agent 410 and the system agent 214. It is understood that the FPGA described generally herein would include a protocol interface, such as a UPI interface 408, for facilitating communications between system agent 214 and FPGA components, such as system agent 406.

Figure 5A:
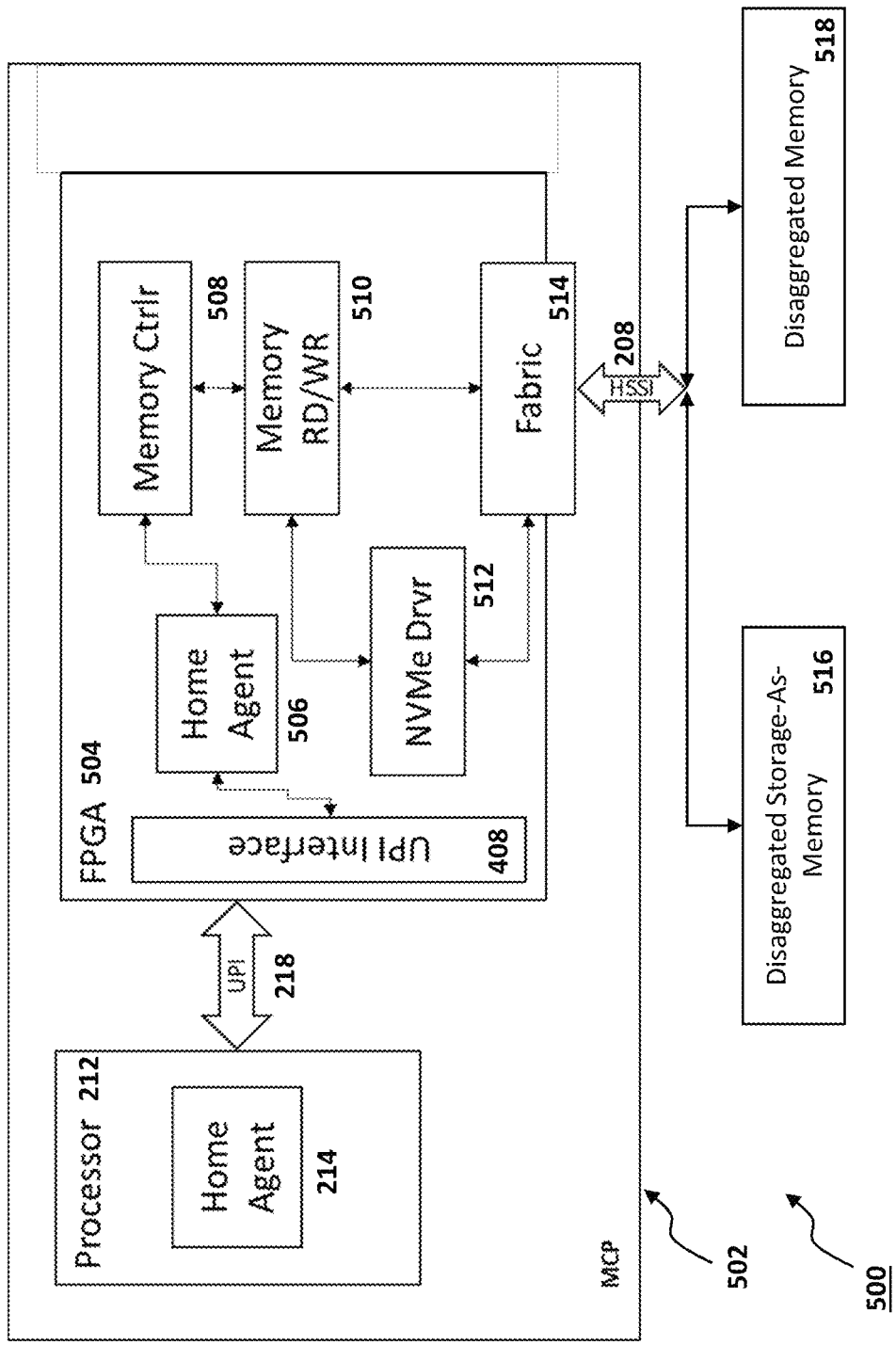
FIG. 5A is a schematic diagram of an example multi-chip platform that includes a field programmable gate array and a system agent for connecting to a fabric-connected storage-as-memory in accordance with embodiments of the present disclosure.
Figure 5B:
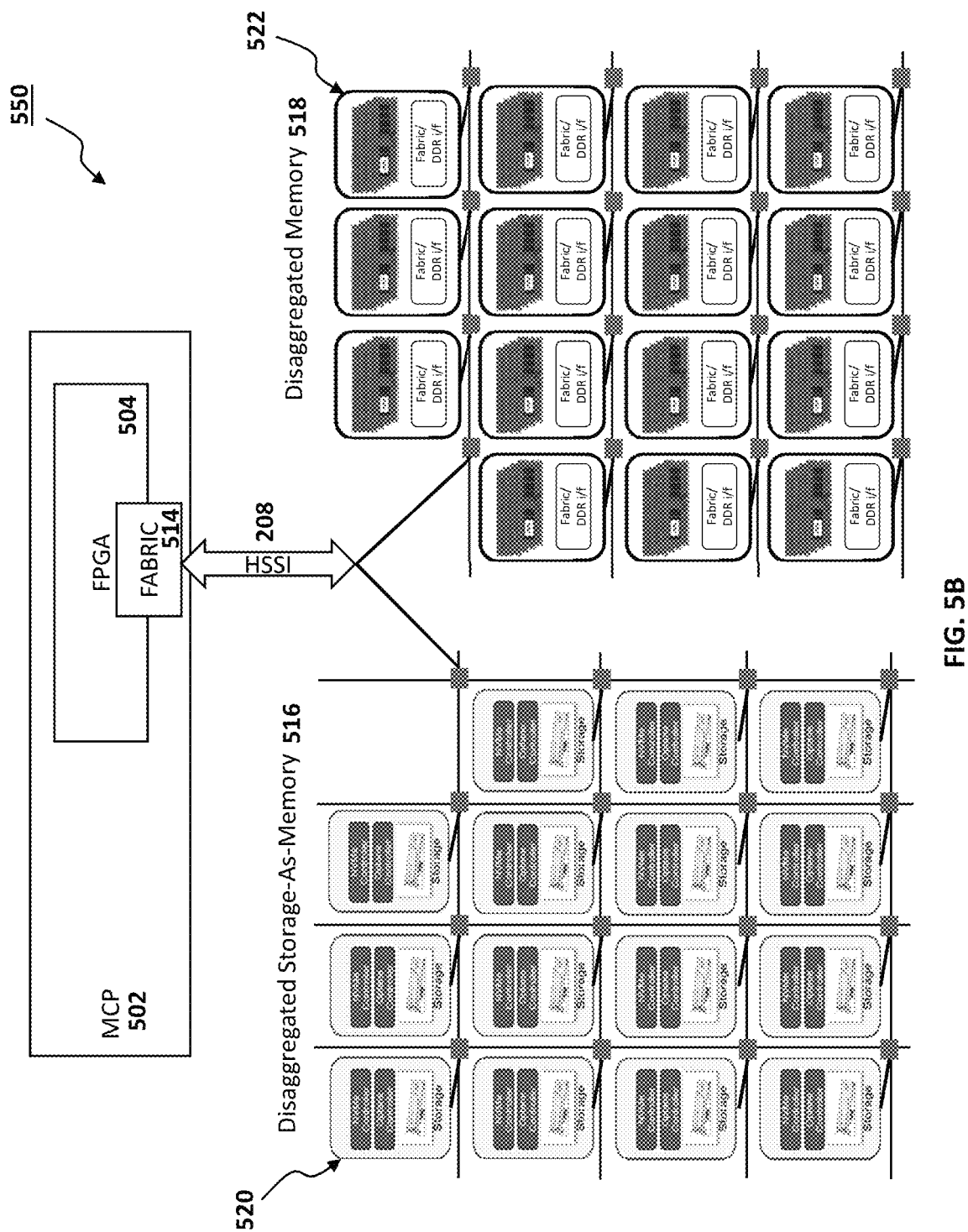
FIG. 5B is a schematic diagram of an example fabric-connected storage-as-memory in accordance with embodiments of the present disclosure.

FIG. 5A is a schematic diagram 500 of an example multi-chip platform 502 that includes a field programmable gate array 504 and a system agent 506 for connecting to a fabric-connected storage-as-memory in accordance with embodiments of the present disclosure. FIG. 5B is a schematic diagram 550 of an example fabric-connected storage-as-memory in accordance with embodiments of the present disclosure. In embodiments of this disclosure, a fabric attached storage (or traditional DRAM memory) can be exposed as memory. In that scenario, HSSI 208 is connected to the external fabric driving the memory transactions over the fabric protocols. The extension of memory could be used to expose disaggregated storage-as-memory 516 or disaggregated memory 518 over a fabric.

The FPGA 504 can include a fabric interface 514 that can provide hardware steps that emulate a fabric interface. The FPGA 504 can also include an NVMe driver 512 to provide the memory access across the HSSI 208. In embodiments, the NVMe driver 512 or the fabric 514 can include a circuitry that emulates the PCIe interface, allowing for NVMe driver 512 to perform memory RD/WR across the HSSI 208. The FPGA 504 can also include a cache 510 and a memory controller 508 coupled to the system agent 506.

FIG. 5B illustrates example disaggregated storage as memory 516 and disaggregated memory 518. The disaggregated storage-as-memory 516 can include a plurality of networked storage devices 520. The disaggregated memory 518 can include a plurality of networked memory elements 522.

Even though the fabric shown here has a 2D mesh topology, it can be replaced with any topologies based on the scaling requirements. Also the HSSI 208 can be extended to support higher bandwidths, especially if DRAMs 522 are attached to the fabric. The components shown as implemented in FPGA, can eventually be integrated into the processor as hardened logic eventually for power/performance reasons.

For performance and potential functional issues around long latency memory reads, asynchronous support can be used. That is, rather than a synchronous read returning with data response, the system agent can issue and complete the instruction with non-data response to the processor. The data is then received through user level MWAIT triggered by the data arrival at the 4 KB Line cache in FPGA.

Figure 6A:
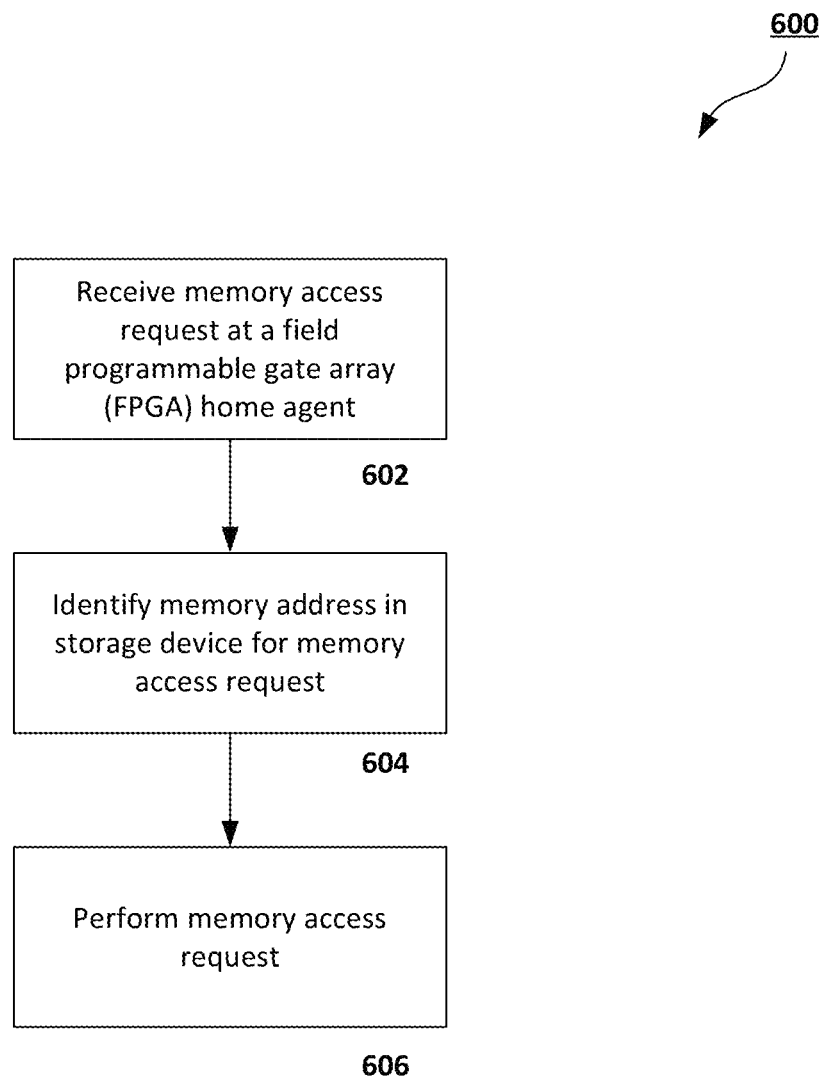
FIG. 6A is a process flow diagram for processing a memory access request in accordance with embodiments of the present disclosure.

FIG. 6A is a process flow diagram 600 for processing a memory access request in accordance with embodiments of the present disclosure. The process can be performed by an field programmable gate array (FPGA), or one or more components of the FPGA, such as a hardware implementation of a system agent. The system agent, for example, can receive a memory access request from another system agent of a processor coupled to the FPGA by a QuickPath Interconnect (QPI) compliant link, such as an UltraPath Interconnect (UPI) compliant link) (602). The system agent can identify a memory location in a connected storage-as-memory across a high speed serial interconnect (HSSI) (604) and execute the memory access request (606).

Figure 6B:
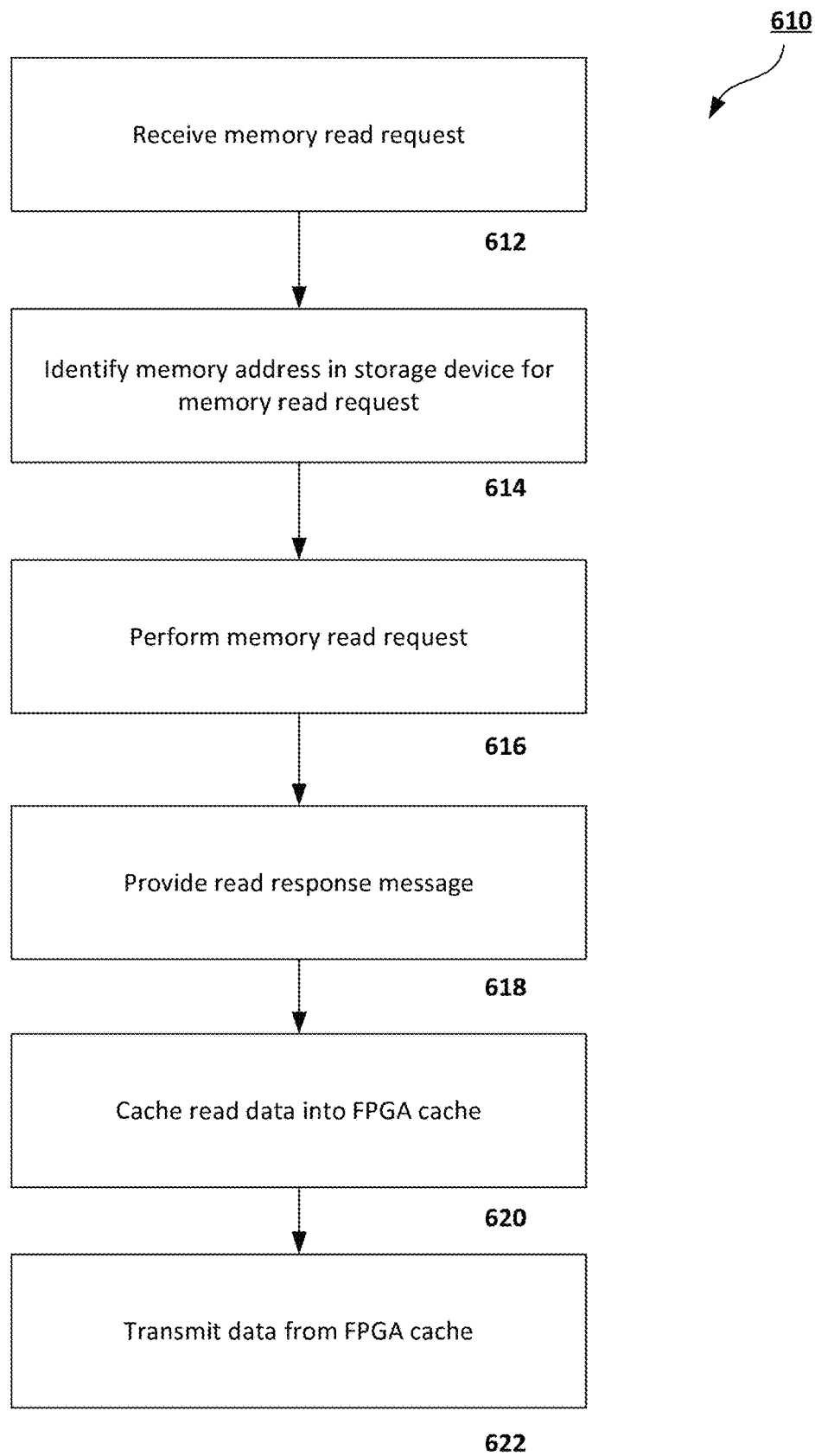
FIG. 6B is a process flow diagram for an asynchronous memory access execution in accordance with embodiments of the present disclosure.

FIG. 6B is a process flow diagram 610 for an asynchronous memory access execution in accordance with embodiments of the present disclosure. The process can be performed by an field programmable gate array (FPGA), or one or more components of the FPGA, such as a hardware implementation of a system agent. The system agent, for example, can receive a memory access request from another system agent of a processor coupled to the FPGA by a QuickPath Interconnect (QPI) compliant link, such as an UltraPath Interconnect (UPI) compliant link) (612). The system agent can identify a memory location in a connected storage-as-memory (614) across a high speed serial interconnect (HSSI) to execute the memory access request (616).

The system agent can then provide a confirmation of the execution of the memory access request to the requesting system agent (618). In embodiments, the confirmation can include a read confirmation. The system agent can cache the read data in a line cache in the FPGA (620) and transmit the read data at some later time from the FPGA line cache (622).

In embodiments, the system agent can provide a write confirmation and can cache the write data in a line cache in the FPGA, and store the write data in a cache at a later time.

Figure 6C:
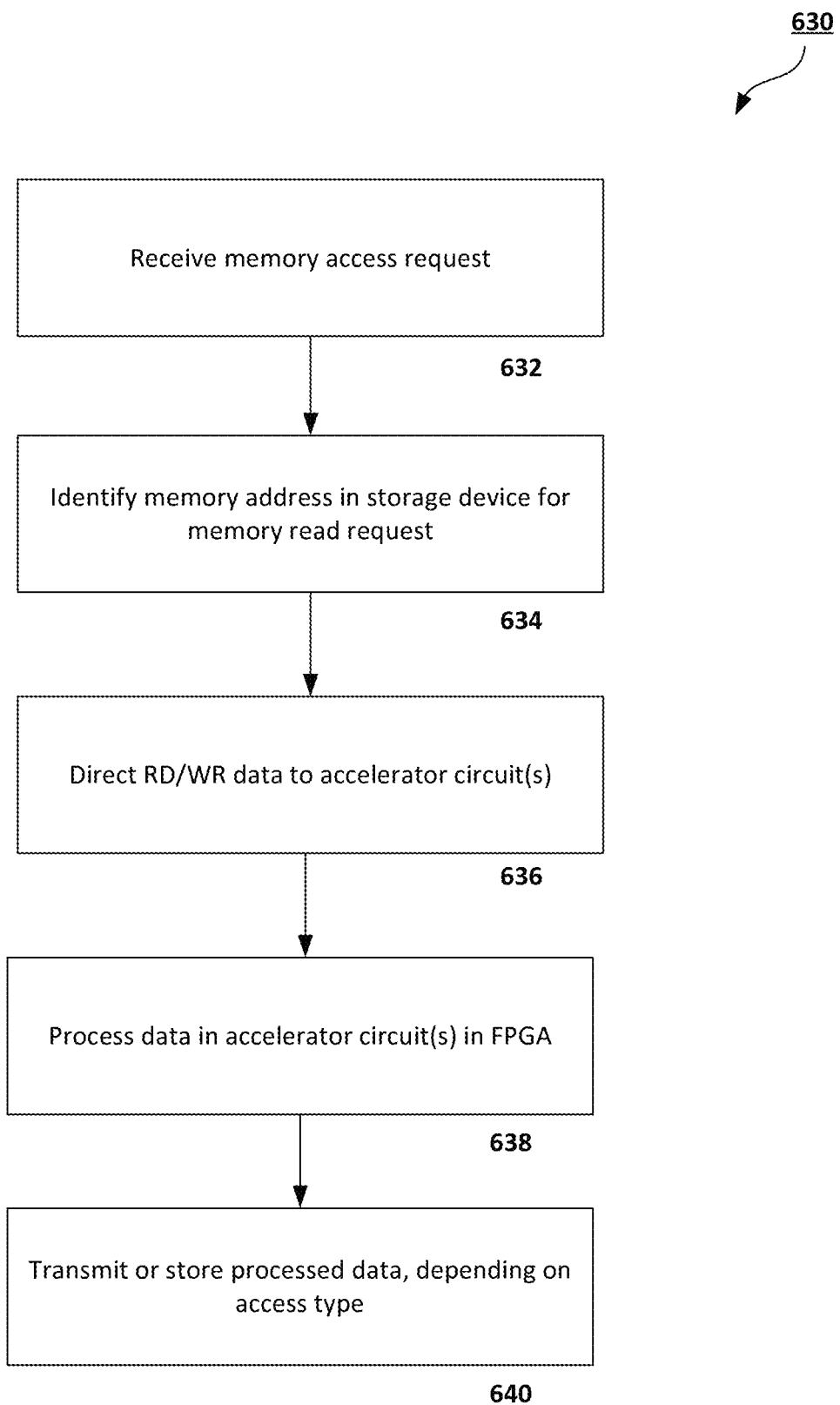
FIG. 6C is a process flow diagram for performing in-line data processing in accordance with embodiments of the present disclosure.

FIG. 6C is a process flow diagram 630 for performing in-line data processing in accordance with embodiments of the present disclosure. The process can be performed by an field programmable gate array (FPGA), or one or more components of the FPGA, such as a hardware implementation of a system agent. The system agent, for example, can receive a memory access request from another system agent of a processor coupled to the FPGA by a QuickPath Interconnect (QPI) compliant link, such as an UltraPath Interconnect (UPI) compliant link) (632). The system agent can identify a memory location in a connected storage-as-memory (634). The system agent can direct data (either read or write data) to one or more accelerator circuits that are part of the FPGA (636). The one or more accelerator circuits can process the data (638). The system agent can then either provide the data to the processor (for read instruction) or can store the processed data in the memory (for write instructions) (640).

Aspects of the present disclosure expose bulk low latency (storage) devices as memory over non-DDR interface, the advantage of which includes access to high capacity memory with traditional memory RD/WR semantics without sacrificing high performing DDR interfaces. This has the potential to improve the application performance where huge in-memory computing is used.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 7:
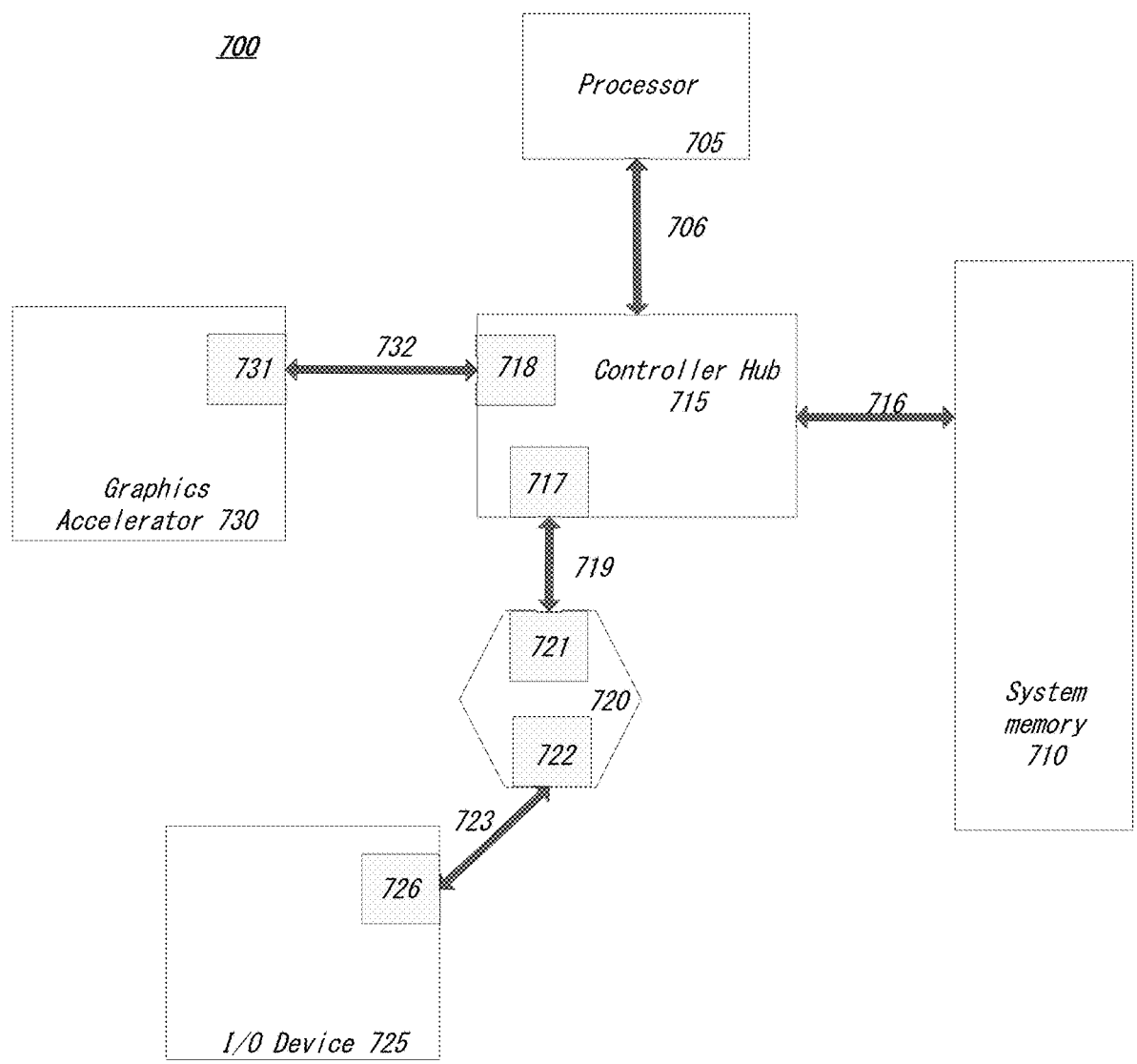
FIG. 7 is a schematic diagram of an embodiment of a fabric composed of point-to-point links that interconnect a set of components in accordance with embodiments of the present disclosure.

Referring to FIG. 7, an embodiment of a fabric composed of point-to-point Links that interconnect a set of components is illustrated. System 700 includes processor 705 and system memory 710 coupled to controller hub 715. Processor 705 includes any processing element, such as a microprocessor, a host processor, an embedded processor, a co-processor, or other processor. Processor 705 is coupled to controller hub 715 through front-side bus (FSB) 706. In one embodiment, FSB 706 is a serial point-to-point interconnect as described below. In another embodiment, link 706 includes a serial, differential interconnect architecture that is compliant with different interconnect standard.

System memory 710 includes any memory device, such as random access memory (RAM), non-volatile (NV) memory, or other memory accessible by devices in system 700. System memory 710 is coupled to controller hub 715 through memory interface 716. Examples of a memory interface include a double-data rate (DDR) memory interface, a dual-channel DDR memory interface, and a dynamic RAM (DRAM) memory interface.

In one embodiment, controller hub 715 is a root hub, root complex, or root controller in a Peripheral Component Interconnect Express (PCIe or PCIE) interconnection hierarchy. Examples of controller hub 715 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 705, while controller 715 is to communicate with I/O devices, in a similar manner as described below. In some embodiments, peer-to-peer routing is optionally supported through root complex 715.

Here, controller hub 715 is coupled to switch/bridge 720 through serial link 719. Input/output modules 717 and 721, which may also be referred to as interfaces/ports 717 and 721, include/implement a layered protocol stack to provide communication between controller hub 715 and switch 720. In one embodiment, multiple devices are capable of being coupled to switch 720.

Switch/bridge 720 routes packets/messages from device 725 upstream, i.e. up a hierarchy towards a root complex, to controller hub 715 and downstream, i.e. down a hierarchy away from a root controller, from processor 705 or system memory 710 to device 725. Switch 720, in one embodiment, is referred to as a logical assembly of multiple virtual PCI-to-PCI bridge devices. Device 725 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 725 may include a PCIe to PCI/PCI-X bridge to support legacy or other version PCI devices. Endpoint devices in PCIe are often classified as legacy, PCIe, or root complex integrated endpoints.

Graphics accelerator 730 is also coupled to controller hub 715 through serial link 732. In one embodiment, graphics accelerator 730 is coupled to an MCH, which is coupled to an ICH. Switch 720, and accordingly I/O device 725, is then coupled to the ICH. I/O modules 731 and 718 are also to implement a layered protocol stack to communicate between graphics accelerator 730 and controller hub 715. Similar to the MCH discussion above, a graphics controller or the graphics accelerator 730 itself may be integrated in processor 705.

Figure 8:
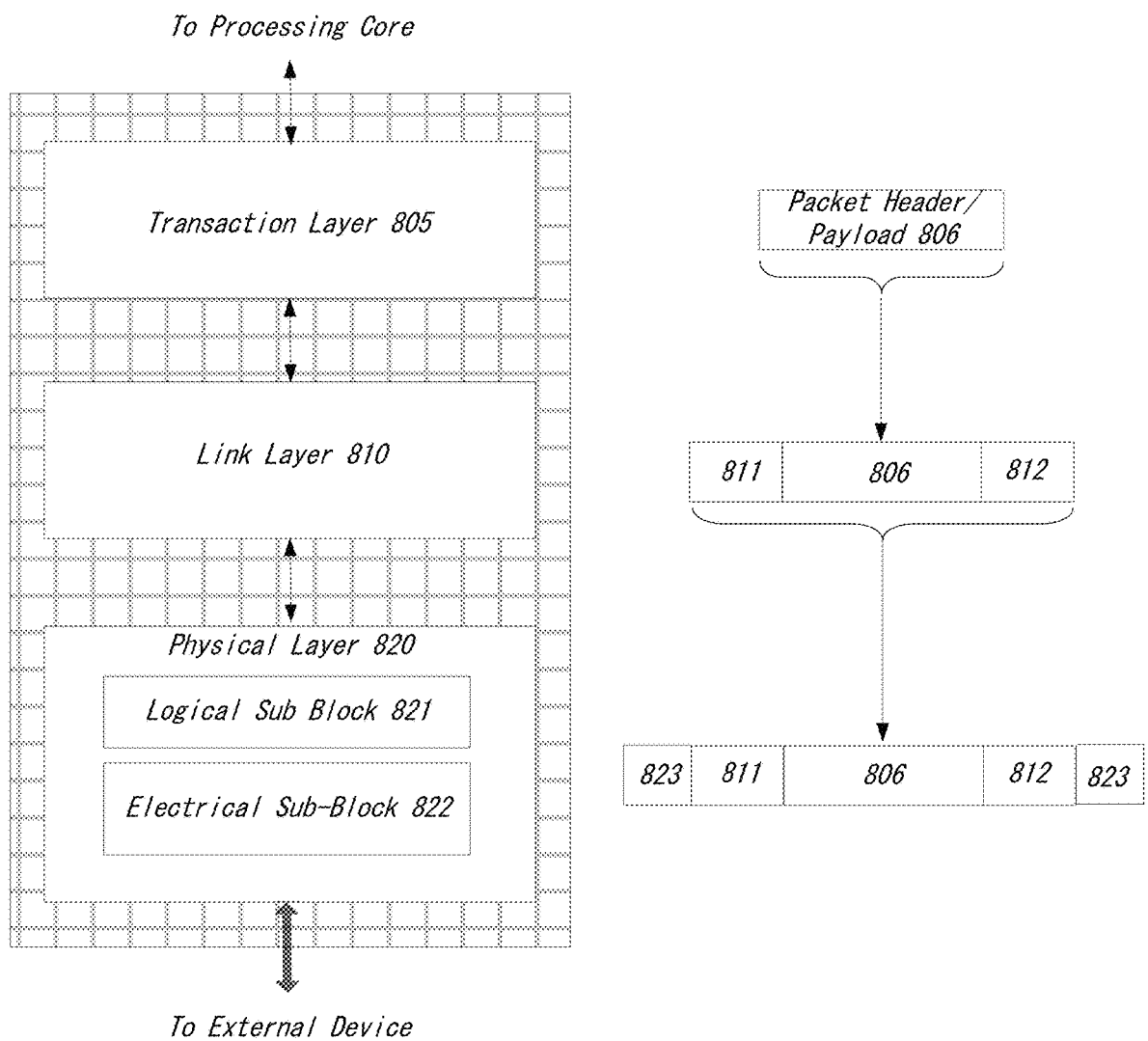
FIG. 8 is a schematic diagram of an embodiment of a layered protocol stack in accordance with embodiments of the present disclosure.

Turning to FIG. 8, an embodiment of a layered protocol stack is illustrated. Layered protocol stack 800 includes any form of a layered communication stack, such as a Quick Path Interconnect (QPI) stack, a PCie stack, a next generation high performance computing interconnect stack, or other layered stack. Although the discussion immediately below in reference to FIGS. 7-10 are in relation to a PCIe stack, the same concepts may be applied to other interconnect stacks. In one embodiment, protocol stack 800 is a PCIe protocol stack including transaction layer 805, link layer 810, and physical layer 820. An interface, such as interfaces 717, 718, 721, 722, 726, and 731 in FIG. 7, may be represented as communication protocol stack 800. Representation as a communication protocol stack may also be referred to as a module or interface implementing/including a protocol stack.

PCI Express uses packets to communicate information between components. Packets are formed in the Transaction Layer 805 and Data Link Layer 810 to carry the information from the transmitting component to the receiving component. As the transmitted packets flow through the other layers, they are extended with additional information necessary to handle packets at those layers. At the receiving side the reverse process occurs and packets get transformed from their Physical Layer 820 representation to the Data Link Layer 810 representation and finally (for Transaction Layer Packets) to the form that can be processed by the Transaction Layer 805 of the receiving device.

Transaction Layer

In one embodiment, transaction layer 805 is to provide an interface between a device's processing core and the interconnect architecture, such as data link layer 810 and physical layer 820. In this regard, a primary responsibility of the transaction layer 805 is the assembly and disassembly of packets (i.e., transaction layer packets, or TLPs). The translation layer 805 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 805. An external device at the opposite end of the link, such as controller hub 715 in FIG. 7, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Figure 9:
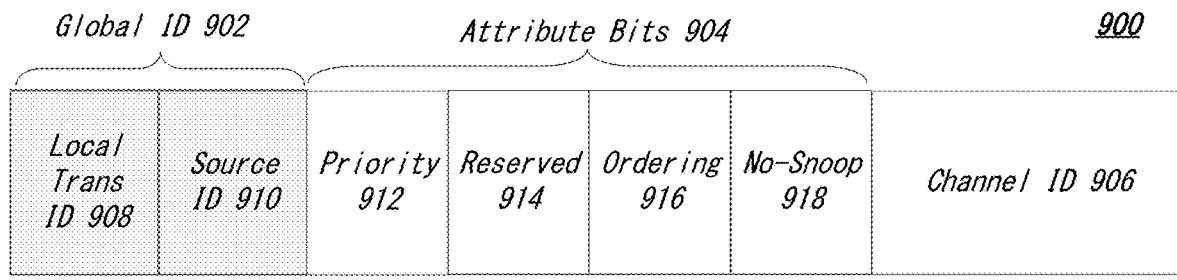
FIG. 9 is a schematic diagram of an embodiment of a PCIe transaction descriptor in accordance with embodiments of the present disclosure.

Quickly referring to FIG. 9, an embodiment of a PCIe transaction descriptor is illustrated. In one embodiment, transaction descriptor 900 is a mechanism for carrying transaction information. In this regard, transaction descriptor 900 supports identification of transactions in a system. Other potential uses include tracking modifications of default transaction ordering and association of transaction with channels.

Transaction descriptor 900 includes global identifier field 902, attributes field 904 and channel identifier field 906. In the illustrated example, global identifier field 902 is depicted comprising local transaction identifier field 908 and source identifier field 910. In one embodiment, global transaction identifier 902 is unique for all outstanding requests.

According to one implementation, local transaction identifier field 908 is a field generated by a requesting agent, and it is unique for all outstanding requests that require a completion for that requesting agent. Furthermore, in this example, source identifier 910 uniquely identifies the requestor agent within a PCIe hierarchy. Accordingly, together with source ID 910, local transaction identifier 908 field provides global identification of a transaction within a hierarchy domain.

Attributes field 904 specifies characteristics and relationships of the transaction. In this regard, attributes field 904 is potentially used to provide additional information that allows modification of the default handling of transactions. In one embodiment, attributes field 904 includes priority field 912, reserved field 914, ordering field 916, and no- snoop field 918. Here, priority sub-field 912 may be modified by an initiator to assign a priority to the transaction. Reserved attribute field 914 is left reserved for future, or vendor-defined usage. Possible usage models using priority or security attributes may be implemented using the reserved attribute field.

In this example, ordering attribute field 916 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 918 is utilized to determine if transactions are snooped. As shown, channel ID Field 906 identifies a channel that a transaction is associated with.

Link Layer

Now returning to FIG. 8, link layer 810, also referred to as data link layer 810, acts as an intermediate stage between transaction layer 805 and the physical layer 820. In one embodiment, a responsibility of the data link layer 810 is providing a reliable mechanism for exchanging Transaction Layer Packets (TLPs) between two components a link. One side of the Data Link Layer 810 accepts TLPs assembled by the Transaction Layer 805, applies packet sequence identifier 811, i.e. an identification number or packet number, calculates and applies an error detection code, i.e. CRC 812, and submits the modified TLPs to the Physical Layer 820 for transmission across a physical to an external device.

Physical Layer

In one embodiment, physical layer 820 includes logical sub block 821 and electrical sub-block 822 to physically transmit a packet to an external device. Here, logical sub-block 821 is responsible for the "digital" functions of Physical Layer 821. In this regard, the logical sub-block includes a transmit section to prepare outgoing information for transmission by physical sub-block 822, and a receiver section to identify and prepare received information before passing it to the Link Layer 810.

Physical block 822 includes a transmitter and a receiver. The transmitter is supplied by logical sub-block 821 with symbols, which the transmitter serializes and transmits onto to an external device. The receiver is supplied with serialized symbols from an external device and transforms the received signals into a bit-stream. The bit-stream is deserialized and supplied to logical sub-block 821. In one embodiment, an 8b/10b transmission code is employed, where ten-bit symbols are transmitted/received. Here, special symbols are used to frame a packet with frames 823. In addition, in one example, the receiver also provides a symbol clock recovered from the incoming serial stream.

As stated above, although transaction layer 805, link layer 810, and physical layer 820 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 10:
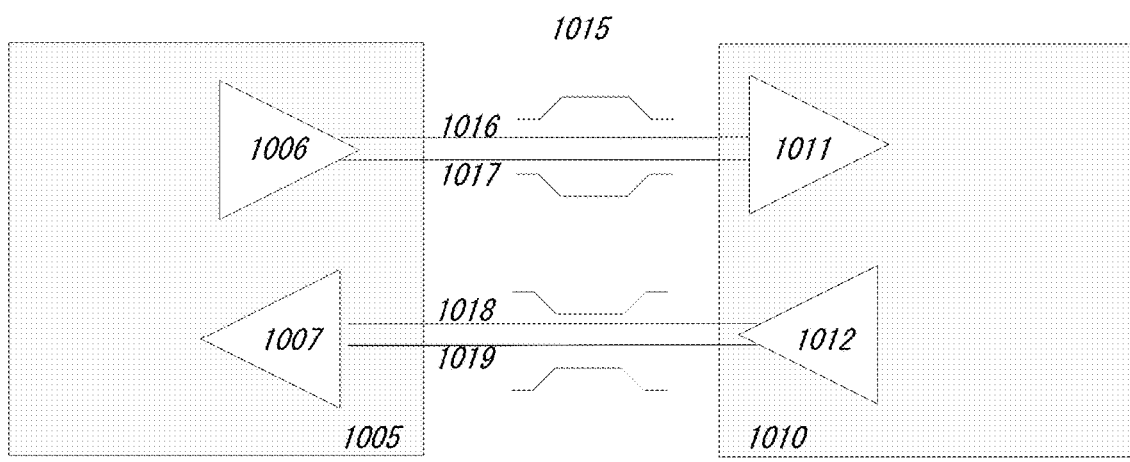
FIG. 10 is a schematic diagram of an embodiment of a PCIe serial point to point fabric in accordance with embodiments of the present disclosure.

Referring next to FIG. 10, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1006/1011 and a receive pair 1012/1007. Accordingly, device 1005 includes transmission logic 1006 to transmit data to device 1010 and receiving logic 1007 to receive data from device 1010. In other words, two transmitting paths, i.e. paths 1016 and 1017, and two receiving paths, i.e. paths 1018 and 1019, are included in a PCIe link.

A transmission path refers to any path for transmitting data, such as a transmission line, a copper line, an optical line, a wireless communication channel, an infrared communication link, or other communication path. A connection between two devices, such as device 1005 and device 1010, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 11:
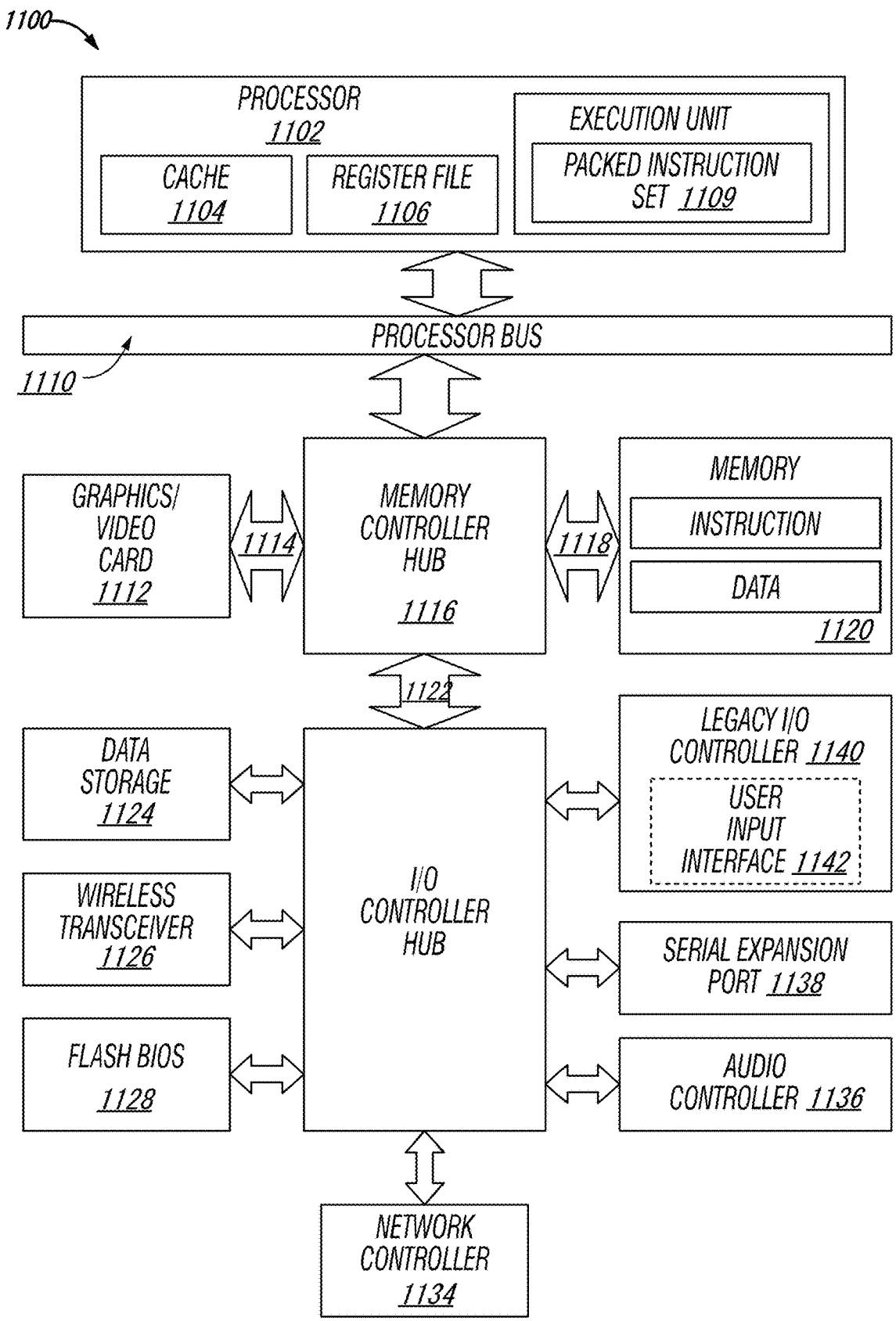
FIG. 11 is a schematic block diagram of an exemplary computer system formed with a processor that includes execution units to execute an instruction, where one or more of the interconnects implement one or more features in accordance with one embodiment of the present disclosure.

Turning to FIG. 11, a block diagram of an exemplary computer system formed with a processor that includes execution units to execute an instruction, where one or more of the interconnects implement one or more features in accordance with one embodiment of the present disclosure is illustrated. System 1100 includes a component, such as a processor 1102 to employ execution units including logic to perform algorithms for process data, in accordance with the present disclosure, such as in the embodiment described herein. System 1100 is representative of processing systems based on the PENTIUM III™, PENTIUM 4T™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1102 includes one or more execution units 1108 to implement an algorithm that is to perform at least one instruction. One embodiment may be described in the context of a single processor desktop or server system, but alternative embodiments may be included in a multiprocessor system. System 1100 is an example of a 'hub' system architecture. The computer system 1100 includes a processor 1102 to process data signals. The processor 1102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1102 is coupled to a processor bus 1110 that transmits data signals between the processor 1102 and other components in the system 1100. The elements of system 1100 (e.g. graphics accelerator 1112, memory controller hub 1116, memory 1120, I/O controller hub 1124, wireless transceiver 1126, Flash BIOS 1128, Network controller 1134, Audio controller 1136, Serial expansion port 1138, I/O controller 1140, etc.) perform their conventional functions that are well known to those familiar with the art.

In one embodiment, the processor 1102 includes a Level 1 (L1) internal cache memory 1104. Depending on the architecture, the processor 1102 may have a single internal cache or multiple levels of internal caches. Other embodiments include a combination of both internal and external caches depending on the particular implementation and needs. Register file 1106 is to store different types of data in various registers including integer registers, floating point registers, vector registers, banked registers, shadow registers, checkpoint registers, status registers, and instruction pointer register.

Execution unit 1108, including logic to perform integer and floating point operations, also resides in the processor 1102. The processor 1102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1102. For one embodiment, execution unit 1108 includes logic to handle a packed instruction set 1109. By including the packed instruction set 1109 in the instruction set of a general-purpose processor 1102, along with associated circuitry to execute the instructions, the operations used by many multimedia applications may be performed using packed data in a general-purpose processor 1102. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1108 may also be used in micro controllers, embedded processors, graphics devices, DSPs, and other types of logic circuits. System 1100 includes a memory 1120. Memory 1120 includes a dynamic random access memory (DRAM) device, a static random access memory (SRAM) device, flash memory device, or other memory device. Memory 1120 stores instructions and/or data represented by data signals that are to be executed by the processor 1102.

Note that any of the aforementioned features or aspects of the disclosure may be utilized on one or more interconnect illustrated in FIG. 11. For example, an on-die interconnect (ODI), which is not shown, for coupling internal units of processor 1102 implements one or more aspects of the disclosure described above. Or the disclosure is associated with a processor bus 1110 (e.g. Intel Quick Path Interconnect (QPI) or other known high performance computing interconnect), a high bandwidth memory path 1118 to memory 1120, a point-to-point link to graphics accelerator 1112 (e.g. a Peripheral Component Interconnect express (PCIe) compliant fabric), a controller hub interconnect 1122, an I/O or other interconnect (e.g. USB, PCI, PCIe) for coupling the other illustrated components. Some examples of such components include the audio controller 1136, firmware hub (flash BIOS) 1128, wireless transceiver 1126, data storage 1124, legacy I/O controller 1110 containing user input and keyboard interfaces 1142, a serial expansion port 1138 such as Universal Serial Bus (USB), and a network controller 1134. The data storage device 1124 can comprise a hard disk drive, a floppy disk drive, a CD-ROM device, a flash memory device, or other mass storage device.

Figure 12:
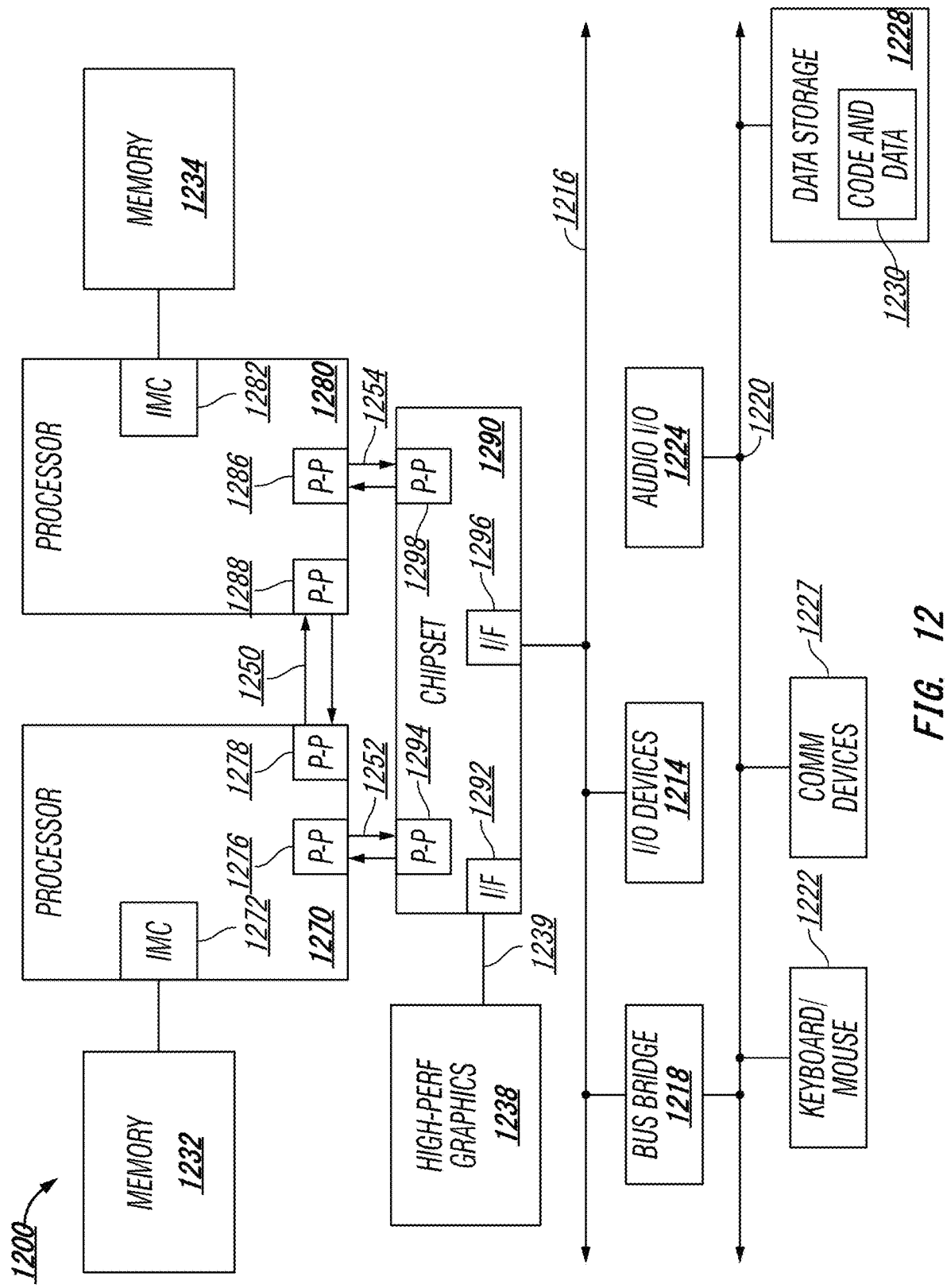
FIG. 12 is a schematic block diagram of a system in accordance with an embodiment of the present disclosure.

Referring now to FIG. 12, shown is a block diagram of a second system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as Intel's Quick Path Interconnect (QPI) architecture. As a result, the disclosure may be implemented within the QPI architecture.

While shown with only two processors 1270, 1280, it is to be understood that the scope of the present disclosure is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

Example 1 is a processor apparatus that includes a microprocessor comprising a microprocessor system agent; and a field programmable gate array (FPGA). The FPGA includes an FPGA system agent to process memory access requests received from the microprocessor system agent across a communications link; a memory controller communicatively coupled to the system agent; and a high speed serial interface to link the system agent with a storage system.

Example 2 may include the subject matter of example 1, wherein the communications link is compliant with a QuickPath Interconnect protocol.

Example 3 may include the subject matter of example 1, wherein the FPGA further comprises hardware logic to emulate a peripheral component interconnect express (PCIe) compliant root complex, the hardware logic emulating a PCIe protocol through one or more hardware operations, and wherein the system agent is configured to process memory access requests across the high speed serial interface using a PCIe compliant protocol.

Example 4 may include the subject matter of any of examples 1-3, wherein the FPGA comprises one or more accelerator circuits to perform processing on data transmitted between the microprocessor and the storage system.

Example 5 may include the subject matter of example 4, wherein the one or more accelerator circuits is configured to perform one or more of compression and/or decompression, encryption and/or decryption, structured query language (SQL) acceleration, or extract-transform-load (ETL) operations.

Example 6 may include the subject matter of example 4, wherein the FPGA further comprises a caching agent and a memory cache to cache data for the one or more accelerator circuits.

Example 7 may include the subject matter of any of examples 1-6, wherein the FPGA comprises a directory cache to store a subset of a storage directory within the FPGA.

Example 8 may include the subject matter of any of examples 1-7, wherein the FPGA comprises a cache line to cache data stored in the storage.

Example 9 may include the subject matter of any of examples 1-8, wherein the FPGA comprises a fabric interface, the fabric interface to interface to a disaggregated storage system supported by a network fabric.

Example 10 may include the subject matter of any of examples 1-9, wherein the FPGA comprises a non-volatile memory express (NVMe) memory controller to interface with an NVMe controller on a connected storage device across a high speed serial interface (HSSI).

Example 11 is a method performed by a hardware element of a processor, the method comprising receiving, at a system agent implemented in a field programmable gate array (FPGA), a memory instruction, from a hardware processor; identifying a memory location managed by the system agent, the memory location part of a storage device communicatively coupled to the FPGA; executing the memory instruction; and providing a confirmation of the memory instruction execution to the hardware processor.

Example 12 may include the subject matter of example 11 and can also include retrieving data stored in the memory from across a high speed serial interface.

Example 13 may include the subject matter of example 12 and can also include transmitting, from the FPGA, data from the memory to the hardware processor across a communications link.

Example 14 may include the subject matter of example 11, wherein the confirmation of the memory instruction execution comprises a asynchronous confirmation response.

Example 15 may include the subject matter of example 14 and can also include retrieving data from the storage-as-memory; transmitting a read response to the hardware processor; caching the data into a cache memory; and after transmitting the read response to the hardware processor, transmitting the data to the hardware processor from the cache memory.

Example 16 may include the subject matter of example 11 and can also include caching data retrieved from the memory location in a cache in the FPGA.

Example 17 may include the subject matter of example 11 and can also include advertising to a system agent of the hardware processor a memory address space managed by the system agent implemented in the FPGA.

Example 18 may include the subject matter of example 11 and can also include performing, by one or more accelerator circuits, data processing on one or both of incoming data to the FPGA or outgoing data from the FPGA.

Example 19 may include the subject matter of example 18, wherein the data processing comprises performing one or more of compression and/or decompression, encryption and/or decryption, structured query language (SQL) acceleration, or extract-transform-load (ETL) operations.

Example 20 may include the subject matter of example 11 and can also include receiving a memory access request at the FPGA system agent from a system agent associated with the hardware processor; determining a memory location for a disaggregated memory element of a fabric of memory elements; and processing the memory access request based on the determined memory location.

Example 21 is system that includes a microprocessor comprising a microprocessor system agent and an accelerator system. The accelerator system includes an system agent to process memory access requests received from the microprocessor system agent across a communications link. The accelerator system also includes a memory controller communicatively coupled to the system agent. The accelerator system also includes a high-speed serial interface to link the system agent with a storage system. The system also includes a storage device connected to the accelerator system by the high-speed serial interface.

Example 22 may include the subject matter of example 21, wherein the storage device comprises a solid-state drive (SSD) non-volatile memory element.

Example 23 may include the subject matter of example 21, wherein the accelerator system comprises a fabric interconnect; and wherein the storage device comprises disaggregated storage-as-memory, the disaggregated storage-as-memory a plurality of solid state drive non-volatile memory elements managed by a network fabric, the fabric coupled to the accelerator system by the fabric interconnect.

Example 24 may include the subject matter of example 21, wherein the accelerator system comprises one or more accelerator circuits to perform processing on data transmitted between the microprocessor and the storage system.

Example 25 may include the subject matter of example 24, wherein the one or more accelerator circuits is configured to perform one or more of compression and/or decompression, encryption and/or decryption, structured query language (SQL) acceleration, or extract-transform-load (ETL) operations.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A processor apparatus comprising:
    a microprocessor comprising a microprocessor system agent; and
    a field programmable gate array (FPGA), the FPGA comprising:
        an FPGA system agent to process memory access requests received from the microprocessor system agent across a communications link, wherein the FPGA system agent and communications link are in a coherency domain of the microprocessor;
        a memory controller communicatively coupled to the system agent; and
        a high-speed serial interface to link the system agent with a storage system;
        wherein the FPGA system agent is to process the memory access requests by translating addresses in the memory access requests to addresses of the storage system and accessing data at the addresses of the storage system through the high-speed serial interface.

2. The processor apparatus of claim 1, wherein the FPGA further comprises hardware logic to emulate a peripheral component interconnect express (PCIe) compliant root complex, the hardware logic emulating a PCIe protocol through one or more hardware operations, and wherein the system agent is configured to process memory access requests across the high-speed serial interface using a PCIe compliant protocol.

3. The processor apparatus of claim 1, wherein the FPGA comprises one or more accelerator circuits to perform processing on data transmitted between the microprocessor and the storage system.

4. The processor apparatus of claim 3, wherein the one or more accelerator circuits is configured to perform one or more of compression and/or decompression, encryption and/or decryption, structured query language (SQL) acceleration, or extract-transform-load (ETL) operations.

5. The processor apparatus of claim 3, wherein the FPGA further comprises a caching agent and a memory cache to cache data for the one or more accelerator circuits.

6. The processor apparatus of claim 1, wherein the FPGA comprises a directory cache to store a subset of a storage directory within the FPGA.

7. The processor apparatus of claim 1, wherein the FPGA comprises a cache line to temporarily store data in the FPGA prior to storing data in the storage system.

8. The processor apparatus of claim 1, wherein the FPGA comprises a fabric interface, the fabric interface to interface to a disaggregated storage system supported by a network fabric.

9. The processor apparatus of claim 1, wherein the FPGA comprises a non-volatile memory express (NVMe) memory controller to interface with an NVMe controller on a connected storage device across a high-speed serial interface (HSSI).

10. A method performed by a hardware element of a processor, the method comprising:
   receiving, at a system agent implemented in a field programmable gate array (FPGA), a memory instruction from a hardware processor over a coherent interconnect link;
   translating a memory address in the memory instruction to identify a memory location managed by the system agent, the memory location part of a storage device communicatively coupled to the FPGA;
   executing the memory instruction;
   providing a confirmation of the memory instruction execution to the hardware processor; and retrieving data stored in the memory from across a high-speed serial interface.

11. The method of claim 10, further comprising transmitting, from the FPGA, data from the memory to the hardware processor across a communications link.

12. The method of claim 10, wherein the confirmation of the memory instruction execution comprises an asynchronous confirmation response.

13. The method of claim 12, further comprising:
   retrieving data from the storage-as-memory;
   transmitting a read response to the hardware processor;
   caching the data into a cache memory; and
   after transmitting the read response to the hardware processor, transmitting the data to the hardware processor from the cache memory.

14. The method of claim 10, further comprising caching data retrieved from the memory location in a cache in the FPGA.

15. The method of claim 10, further comprising advertising to a system agent of the hardware processor a memory address space managed by the system agent implemented in the FPGA.

16. The method of claim 10, further comprising performing, by one or more accelerator circuits, data processing on one or both of incoming data to the FPGA or outgoing data from the FPGA.

17. The method of claim 16, wherein the data processing comprises performing one or more of compression and/or decompression, encryption and/or decryption, structured query language (SQL) acceleration, or extract-transform-load (ETL) operations.

18. The method of claim 10, further comprising:
   receiving a memory access request at the FPGA system agent from a system agent associated with the hardware processor;
   determining a memory location for a disaggregated memory element of a fabric of memory elements; and
   processing the memory access request based on the determined memory location.

19. A system comprising:
   a microprocessor comprising a microprocessor system agent;
   an accelerator system comprising:
      a system agent to process memory access requests received from the microprocessor system agent across a communications link, wherein the system agent and communications link are in a coherency domain of the microprocessor;
      a memory controller communicatively coupled to the system agent; and
      a high speed serial interface to link the system agent with a storage system; and
   a storage device connected to the accelerator system by the high speed serial interface;
   wherein the system agent is to process the memory access requests by translating addresses in the memory access requests to addresses of the storage system and accessing data at the addresses of the storage system through the high-speed serial interface.

20. The system of claim 19, wherein the storage device comprises a solid state drive (SSD) non-volatile memory element.

21. The system of claim 19, wherein the accelerator system comprises a fabric interconnect; and
   wherein the storage device comprises disaggregated storage-as-memory, the disaggregated storage-as-memory a plurality of solid state drive non-volatile memory elements managed by a network fabric, the fabric coupled to the accelerator system by the fabric interconnect.

22. The system of claim 19, wherein the accelerator system comprises one or more accelerator circuits to perform processing on data transmitted between the microprocessor and the storage system.

23. The system of claim 22, wherein the one or more accelerator circuits is configured to perform one or more of compression and/or decompression, encryption and/or decryption, structured query language (SQL) acceleration, or extract-transform-load (ETL) operations.

\* \* \* \* \*